United States Patent

Julie

[15] 3,654,547

[45] Apr. 4, 1972

[54] ALTERNATING CURRENT ATTENUATOR CIRCUIT

[72] Inventor: Loebe Julie, New York, N.Y.

[73] Assignee: Julie Research Laboratories, Inc., New York, N.Y.

[22] Filed: July 22, 1970

[21] Appl. No.: 57,068

[52] U.S. Cl. ....................323/74, 323/79

[51] Int. Cl. ....................G05f 3/04

[58] Field of Search ....................330/92; 333/81 R; 323/66, 74, 323/79

[56] References Cited

UNITED STATES PATENTS

| | | | |
|---|---|---|---|
| 3,059,190 | 10/1962 | Hafler | 330/92 |
| 2,900,609 | 8/1959 | Estkowski | 333/81 X |
| 3,145,335 | 8/1964 | Ouchi | 323/74 |
| 3,449,681 | 6/1969 | Hafler | 333/81 X |

*Primary Examiner*—A. D. Pellinen
*Attorney*—Eliot S. Gerber

[57] ABSTRACT

An attenuator for alternating current is designed to provide a precise loss over a wide band of frequencies. The attenuator comprises two resistors, a voltage divider and two fixed capacitors connected in a circuit. The high frequency adjustment is obtained by changing the variable arm of the divider.

2 Claims, 3 Drawing Figures

Patented April 4, 1972 3,654,547

INVENTOR.
LOEBE JULIE

BY

Eliot S. Gerber
ATTORNEY

ALTERNATING CURRENT ATTENUATOR CIRCUIT

DESCRIPTION

The present invention relates to electronic attenuators and more specifically to a precision attenuator for alternating currents.

An attenuator is an electronic circuit which provides a known amount of loss or attenuation from the input to the output. Various types of attenuator circuits have been proposed for direct or alternating current.

In some instruments it is important that the attenuator provide a precise predetermined attenuation, that such attenuation be the same regardless of the input frequency over a wide band of frequencies, and that the attenuation not vary with age or temperature. One type of attenuator relies upon the adjustment value of a capacitor, but adjustable capacitors are less stable than fixed capacitors and are subject to change in capacitance with variations in temperature and humidity. These requirements have not been fully met by the previous circuits, although they have sometimes used exact and expensive components.

It is the objective of the present invention to provide an attenuator which provides a precise value of attenuation over a wide band of input frequencies.

Further objectives of the present invention are to provide such an attenuator circuit which will: (1) provide a precise attenuation or be readily adjustable to the correct attenuation, despite aging and variations in temperature and humidity; (2) not cost appreciably more than other precision attenuator circuits; (3) not utilize an adjustable capacitor; (4) provide separate low and high frequency adjustments.

In accordance with the present invention a precision attenuator circuit is provided. The circuit has two input terminals. Two fixed capacitors, in series, are connected across the input terminals. A series of resistors, comprising two fixed resistors and two variable resistors, are connected in parallel with the series of capacitors. The variable arm of one variable resistor is connected to between the two capacitors. The variable arm of the other variable resistor is connected to an output terminal. The other output terminal is common with an input terminal.

Other objectives of the present invention will be apparent from the following detailed description, giving the inventor's best mode of practicing the invention, the description being taken in conjunction with the accompanying drawings.

An attenuator is a network which introduces a known attenuation when working between resistor impedances to which the input and output of the attenuator are matched. Either of the resistance impedances may be the source and the other load. The attenuation value, that is, the loss, of such networks is expressed as a voltage ratio and is the same regardless of the direction of input or output.

Figure 1:
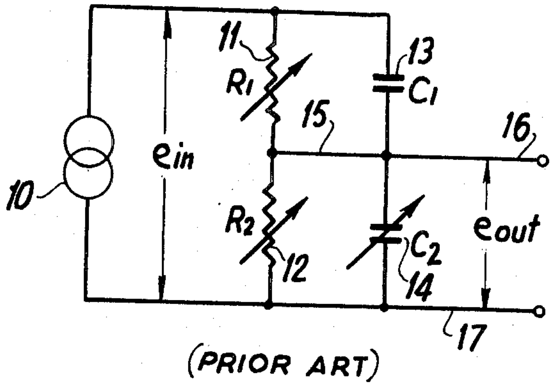
(PRIOR ART) FIG. 1
FIG. 1 is a schematic diagram of a prior art circuit of an AC attenuator.

FIG. 1 illustrates one type of commonly used precision AC attenuator. The attenuator is adjusted to give the desired precise attenuation value. Generally it is desirable that the attenuation be constant over a wide frequency band. As shown, the input 10, which is an alternating current, is connected across two resistors 11 (R1) and 12 (R2) in series. Two capacitors 13 (C1) and 14 (C2) are connected in parallel with the resistors and a line 15 leads from between the resistance to between the capacitors. The resistors 11 (R1) and 12 (R2) are adjustable and the capacitor 14 (C2) is also adjustable. The output is from line 16, which is connected to the mid-point of the capacitors, and line 17, which is common to the input. The low frequency adjustment of the network of FIG. 1 is obtained by adjusting resistor 12(R2). Alternatively, the low frequency adjustment may be obtained by adjusting resistor 11 (R1) or by adjusting both resistors 11 and 12. The high frequency adjustment is obtained by adjusting capacitor 14 (C2). Alternatively, capacitor 13 (C1) may be made adjustable for high frequency adjustment, or both capacitors 13 and 14 may be adjustable for such high frequency adjustment. The adjustments are made so that if $R1 \cdot C1 = R2 \cdot C2$, the attenuation will be constant over the entire frequency range. The major disadvantage of the type of the prior art circuit of FIG. 1 lies in its use of an adjustable capacitor $C2$ or, alternatively, in its having both $C1$ and $C2$ adjustable capacitors. Adjustable capacitors are less stable than fixed capacitors under environmental disturbances such as temperature variations, humidity, and aging.

Figure 2:
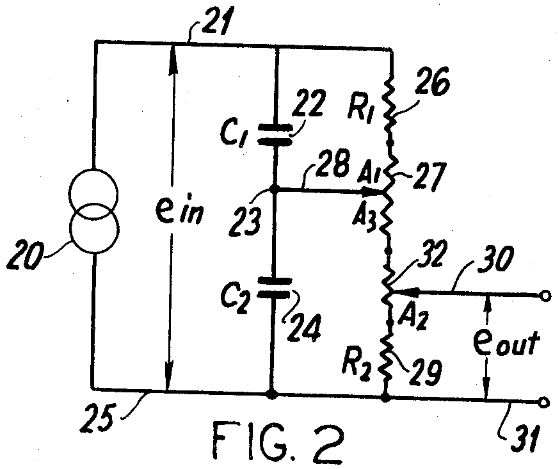
FIG. 2 is a schematic circuit diagram of the first embodiment of the attenuator of the present invention.
Figure 3:
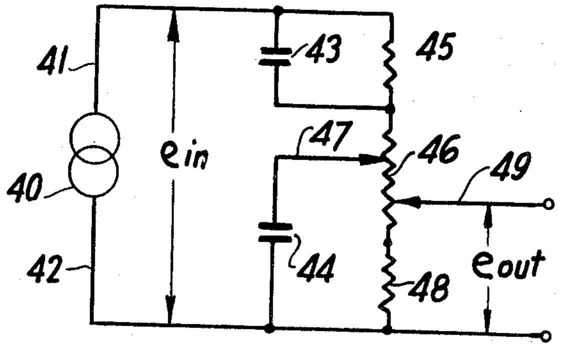
FIG. 3 is a schematic circuit diagram of the second embodiment of the attenuator of the present invention.

The attenuators of the present invention are shown in FIGS. 2 and 3. In the attenuator network of FIG. 2, the input 20 ($e_{in}$) is an alternating current which is connected by line 21 to a terminal of the fixed capacitor 22. The opposite terminal of capacitor 22 is connected to a connection point 23 which is connected to one terminal of the capacitor 24. The opposite end of the capacitor 24 is connected by line 25 to the input 20. The line 21 is also connected to one terminal of a fixed resistor 26 ($R1$). The opposite end of the resistor 26 is connected to a variable resistor 27, which is a voltage divider. A movable arm 28 of the voltage divider 27 is connected to the mid-point connection point 23. In voltage divider 27 the arm 28 provides a division of the resistance, that division being designated A1 for the portion above the arm 28 and A3 for the portion below the line.

The opposite terminal of the voltage divider 27 is connected to a second voltage divider 32 (A2) whose opposite end is connected to the fixed resistor 29 ($R2$). The output is taken from a variable arm 30 which is connected to the voltage divider 32. The other output line 31 is common with the input line 25. It will be noted that both capacitor 22 ($C1$) and capacitor 24 ($C2$) are fixed capacitors. The high frequency adjustment is obtained by moving the arm 28 over the voltage divider 27. The low frequency adjustment is obtained by moving the arm 30 over the voltage divider 32. The attenuation loss of the circuit of FIG. 2 is constant, and the high frequency adjustment is obtained when the adjustments are made so that $(R1+A \cdot C1=C2(R2+A2+A3)$.

An alternative circuit is shown in FIG. 3, which may be utilized only when small values of adjustment are needed. In that circuit the input from the alternating current source 40 is on lines 41 and 42. A fixed capacitor 43 is connected to line 41 and a second fixed capacitor 44 is connected to line 42. A fixed resistor 45 is connected to line 41. A voltage divider 46, having adjusting movable arm 47 and adjusting variable output arm 49, is connected to the opposite end of resistor 45. The end terminal of voltage divider 46 is connected to a fixed resistor 48, whose opposite end is connected to line 42.

I claim:

1. An attenuator circuit for alternating currents which is adjustable to provide a precise attenuation over a broad range of frequencies, the circuit comprising first and second input terminals, first and second fixed capacitors connected to respective input terminals, first and second fixed resistors connected to respective input terminals, a voltage divider means comprising a variable resistor having first and second end terminals and two variable arms, said end terminals being connected in series between said fixed resistors, with said first end terminal being connected to said second resistor, one of said variable arms being connected to said first capacitor at its end opposite to its connection with an input terminal, the other of said variable arms being the output terminal of the circuit, and a connection from said second capacitor at its end opposite to its connection with said second input terminal to an end terminal of said variable resistor, wherein the arm connected to the capacitor is adjusted to provide the low frequency adjustment and the output terminal arm is adjusted to provide the high frequency adjustment.

2. An attenuator circuit for alternating currents which is adjustable to provide a precise attenuation over a broad range of frequencies, the circuit comprising first and second input terminals, first and second fixed capacitors connected to respective input terminals, first and second fixed resistors connected to respective input terminals, a voltage divider means comprising a first and a second variable resistor each having first and second end terminals and each having one variable arm, said end terminal of each said variable resistor being connected in series between said fixed resistors, one of said variable arms being connected to both said first and second capacitors at their ends opposite to their connections with the input terminals, the other of said variable arms being the output terminal of the circuit, wherein the arm connected to the capacitors is adjusted to provide the low frequency adjustment and the output terminal arm is adjusted to provide the high frequency adjustment.

* * * * *

PO-1050
(5/69)

UNITED STATES PATENT OFFICE
CERTIFICATE OF CORRECTION

Patent No. 3,654,547 Dated April 4, 1972

Inventor(s) LOEBE JULIE

It is certified that error appears in the above-identified patent and that said Letters Patent are hereby corrected as shown below:

Column 2, line 44, formula should read:

-- (R1+A1)·C1=C2(R2+A2+A3) --

Signed and sealed this 18th day of July 1972.

(SEAL)
Attest:

EDWARD M.FLETCHER,JR.
Attesting Officer

ROBERT GOTTSCHALK
Commissioner of Patents